July 8, 1958

U. P. ROACH 2,842,633

LOAD MEASURING DEVICE

Filed March 19, 1957

INVENTOR.
URBAN P. ROACH
BY
Robert R. Candor
HIS ATTORNEY

July 8, 1958 — U. P. ROACH — 2,842,633
LOAD MEASURING DEVICE
Filed March 19, 1957 — 2 Sheets-Sheet 2
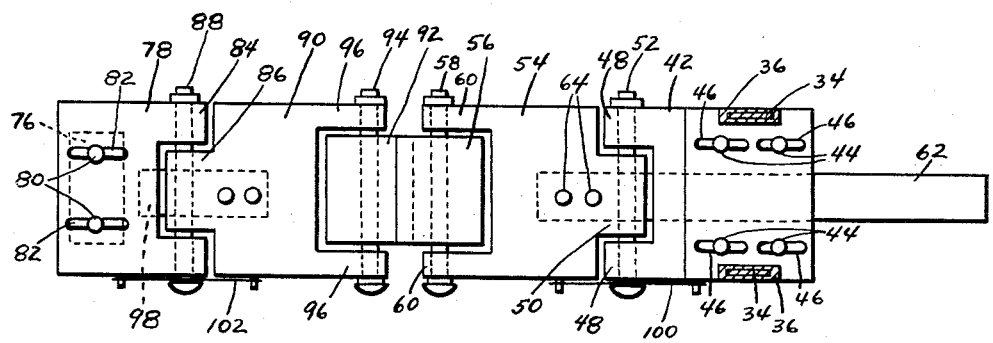
Fig. 3
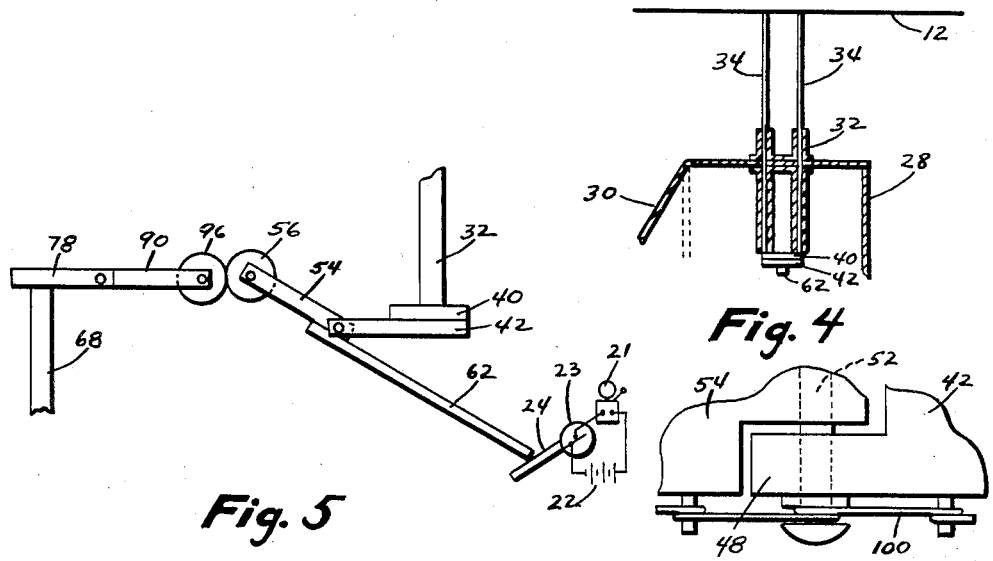
Fig. 4
Fig. 5
Fig. 7
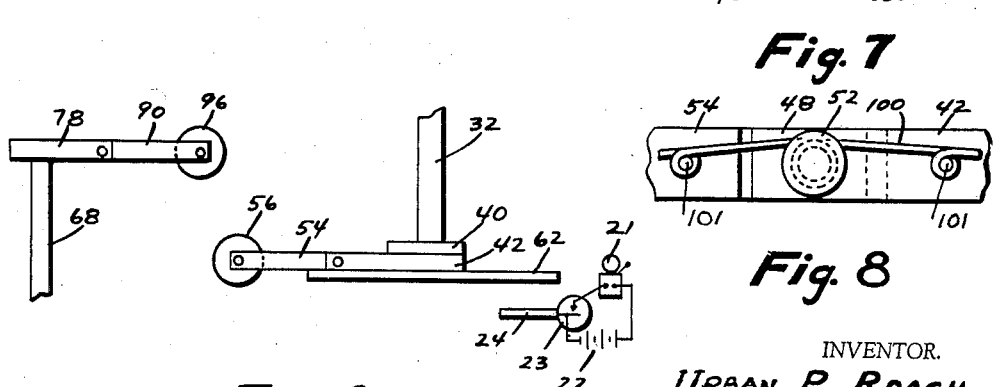
Fig. 6
Fig. 8
INVENTOR.
URBAN P. ROACH
BY Robert R. Candor
HIS ATTORNEY

United States Patent Office 2,842,633
Patented July 8, 1958

2,842,633

LOAD MEASURING DEVICE

Urban P. Roach, Dayton, Ohio

Application March 19, 1957, Serial No. 647,140

7 Claims. (Cl. 200—85)

This invention relates to a load measuring device.

It is often very desirable to be able to determine roughly the weight of a load on a vehicle, such as a dump truck. For example, trucks are frequently loaded a considerable distance from the usual truck scales. The loaded trucks are then driven to the scales and weighed. If the load is too light or too heavy, the truck is generally driven back to the loading place and the load is changed by guess work in an effort to rectify the error. Sometimes this must be repeated several times before a sufficiently accurate load is obtained.

An object of this invention is to provide a load measuring device on the truck capable of roughly measuring the weight of the load while it is being loaded.

Another object of this invention is to provide a load measuring device capable of warning when the weight of the material being loaded is approaching the desired weight.

There are laws which limit the load applied to an axle of a truck, and there are substantial fines for violation of such laws. Sometimes the truck must travel on such a road on its way to the scales. If the truck has been inadvertently overloaded, there is danger of a fine.

Another object of this invention is to provide a load measuring device on the axle of a truck which is the most likely to be the one overloaded.

Another object of this invention is to provide a truck or the like with a weight signalling device which is not likely to be operated by the bobbing action of the truck while it is traveling over rough roads.

Further objects of this invention will become apparent as the description proceeds with reference to the accompanying drawings, in which:

Figure 3 is a plan view of a portion of Figure 2.

Figure 4 is a transverse cross section of a part of Figure 2.

Figure 5 is a view of certain parts of Figure 2 when the truck is almost loaded.

Figure 6 is a view similar to Figure 5 showing the parts when the truck is completely loaded.

Figure 7 is an enlarged plan view of part of one of the levers.

Figure 8 is a side view of Figure 7.

Figure 1:
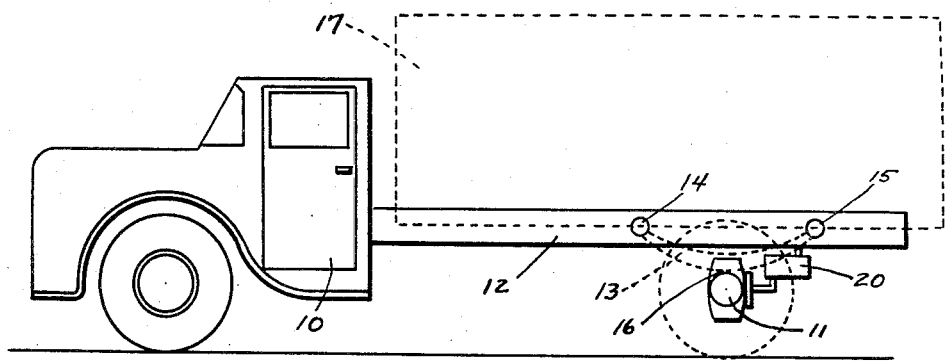
Figure 1 is a diagrammatic elevation of a truck to which my invention has been applied.

The vehicle or truck 10 is provided with a rear axle member 11 which bears a major portion of the load placed on the load body member 12. Spring means, such as leaf springs 13, are placed near each end of the axle and are connected to the body at 14 and 15 in the usual manner and are connected to the axle at 16. If desired, the body may extend upwardly as indicated by the dotted line 17, as is apparent.

Particularly on dump trucks or the like, the load on the rear axle is the heaviest, and is quite likely to be representative or proportional to the entire load on the truck. My load measuring device 20 is preferably applied to the truck between the rear axle and the load body, to cooperate with the springs at this location to warn when the load is approaching the desired weight, and also to signal when the load has reached such desired amount.

The measuring device preferably includes a bell or buzzer 21 energized from the battery 22 when the switch 23 is closed. The switch 23 is closed by the downward movement of the actuator or blade 24, which is spring biased upwardly to maintain the switch open, except when the blade 24 is pressed down.

The switch 23 is closed to sound the warning signal when a predetermined weight load is reached near the desired limit. The switch is opened again when a further weight is added to bring the total to the desired limit. This is accomplished by the lever arrangement within the box 28, with a hinged door or side 30, for access to the parts therein.

One part of the lever arrangement is attached to a vertically adjustable sleeve or sleeves 32 fitted over the vertical rod or rods 34, which are secured to and supported by the body member 12. The box 28 is attached to and supported by the sleeves 32. The sleeves 32 are adjustably secured to the rods 34 by screw means 36 or any other well known vertically adjustable securing means.

A first upwardly hinged and downwardly locked substantially horizontal lever construction 38 is secured to the sleeves 32 by means of the plate 40, which is welded or otherwise secured to the bottom ends of the sleeves 32. A sidewise adjustable plate 42 is secured to the plate 40 by nut and bolts 44 passing through the slots 46 in plate 40. The plate 42 has forks 48 which receive the tongue 50 which is hingedly secured thereto by a pin 52 passing through the forks 48 and the tongue 50. The tongue 50 is part of the plate 54 which carries the roller 56 by means of the pin 58 passing through the forks 60 of plate 54. The plate 54 and the rollers 58 form an upwardly hinged lever fulcrumed at 52. The lever is downwardly locked by the lever extension 62 which is secured to the plate 54 by the rivets 64 or the like and which locks or prevents the lever or plate 54 from swinging below the horizontal position. The lever extension 62 contacts the switch actuator or blade 24 when the truck is nearly loaded, as will become apparent.

A second upwardly hinged and downwardly locked substantially horizontal lever construction 66 is carried by a rod 68 which is secured to the differential housing 70 of the axle member 11 by means of a plate 72 welded or otherwise secured to the end cover 74 of the differential housing 70.

The lever construction 66 includes a fixed plate 76 secured or welded to the upper end of rod 68. A laterally adjustable plate 78 is secured to the plate 76 by nut and bolts 80 passing through slots 82. The forks 84 of the plate 78 receive tongue 86 which is fulcrumed on pin 88. The tongue 86 is part of the upwardly hinged plate 90 which carries roller 92 by pin 94 passing through forks 96 and roller 92. The plate 90 is downwardly locked by means of the lever extension 98 which is secured to the bottom of plate 90 and presses against the bottom of plate 78 when the plate 90 is in horizontal position.

Both levers 54 and 90 are downwardly biased by springs 100 and 102 respectively. Spring 100 is wound around the end of pin 52 and the spring ends are attached to the plates 42 and 54, by pins 101. Spring 102 is wound around pin 88 and has its ends secured to the plates 90 and 78, by pins 103.

If desired, rod 68 may be made vertically adjustable by a sleeve and rod construction, not shown, similar to rod 34 and sleeve 32 previously described.

Figure 2:
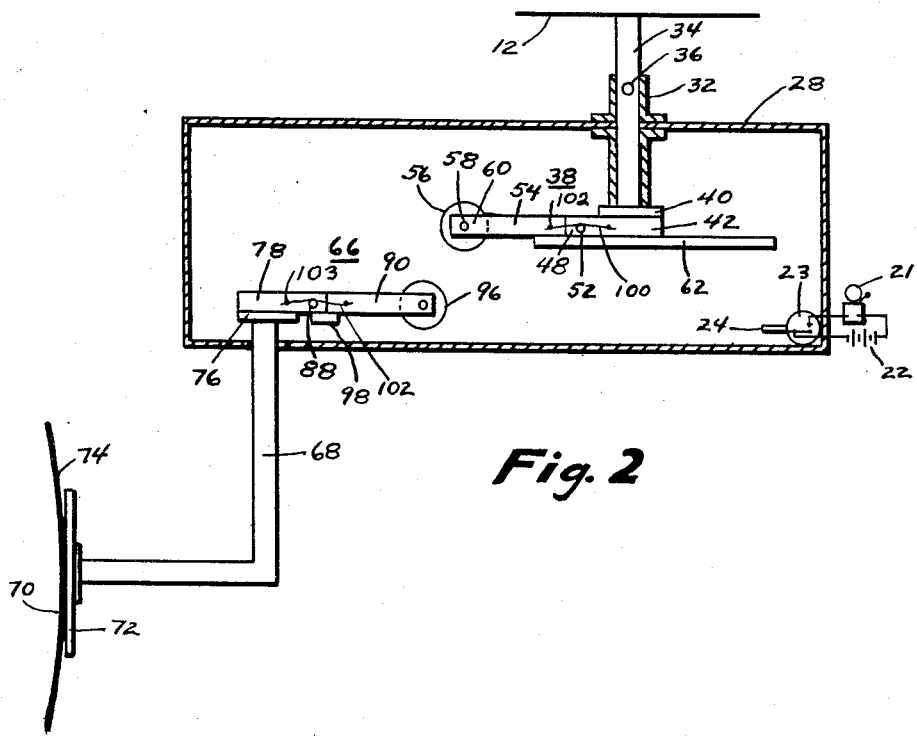
Figure 2 is a vertical cross-section, on an enlarged scale, of the load measuring device.

The light load, or empty position, of the measuring device is shown in Figure 2, wherein the roller 56 is far above the roller 96 and hence ordinarily cannot engage it during bobbing of the truck on rough roads.

The nearly loaded position is shown in Figure 5 in which the load body 12 has lowered on springs 13, causing rods 34 and sleeves 32 to lower the lever construction 38 until the roller 56 contacts the roller 96 and causes levers 54 and 62 to assume an upwardly slanting position so lever 62 presses down on lever 24 to close switch 23 and sound bell or buzzer 21. This warns that the load is nearly to its maximum desired weight.

Further loading of the truck body causes rods 34 and sleeves 32 to move roller 56 further downward until it snaps below roller 96, as shown in Figure 6. This moves plates or levers 54 and 62 to horizontal position below roller 96 and above switch lever 24 so switch 23 is opened, and the bell or buzzer is silenced. The stopping of the sound is an indication that the maximum desired load has been reached. The switch 23 remains open in the position of Fig. 6 and is not again operated by the bobbing action of the truck while it travels with said load over rough roads, thus preventing wear on the switch during such travel. Also the indicator 21 does not have its indicating condition changed under these conditions until the truck is substantially emptied.

The vertical adjustment diagrammatically indicated at 36 enables the measuring device to be set or calibrated for varying load weights. Any other vertical adjustment means may be used in lieu of screw 36, such as a rachet or the like, not shown.

When the truck is emptied, the roller 96 swings upwardly, allowing roller 56 to snap upwardly above roller 96 during its return from the position of Figure 6 to that of Figure 2. This automatically resets the load measuring device in readiness again to indicate when another maximum desired load has been placed on the truck.

While the embodiment now preferred has been disclosed, as required by the statutes, it is understood that other embodiments may be used, in accordance with the scope of the claims, which follow.

I claim:

1. In a vehicle; a wheel axle member; a load body member; spring means supporting said body member on said axle member; an upwardly hinged and downwardly locked substantially horizontal fiirst lever supported from said body member; a switch closed by said lever when it has hingedly swung upwardly a predetermined distance; and an upwardly hinged and downwardly locked substantially horizontal second lever supported from said axle member, said first lever engaging said second lever and hingedly swinging upwardly said predetermined distance to close said switch when a predetermined weight has been placed on said body member, and snapping downwardly past said second lever when a further predetermined weight has been placed on said body member to open said switch.

2. In a vehicle as set forth in claim 1, a signal energized and deenergized on the closing and opening of said switch.

3. In a vehicle: a wheel axle member; a load body member; spring means supporting said body member on said axle member; an upwardly hinged and downwardly locked substantially horizontal first lever supported from said body member; a switch changed from its original condition by said lever when it has hingedly swung upwardly a predetermined distance; and an upwardly hinged and downwardly locked substantially horizontal second lever supported from said axle member, said first lever engaging said second lever and hingedly swinging upwardly said predetermined distance to change said switch from its original condition when a predetermined weight has been placed on said body member, and snapping downwardly past said second lever when a further predetermined weight has been placed on said body member to restore said switch to its original condition.

4. In a vehicle as set forth in claim 3, a signal energized and deenergized by the conditions of said switch.

5. In a vehicle: a wheel axle member; a load body member; resilient means supporting said body member on said axle member; an electrically operated weight indicator; a switch having a circuit switching action for changing the indicating condition of said weight indicator when a load of desired predetermined weight has been placed on said load body member; and means automatically responsive to said load preventing the operation of said circuit switching action of said switch by the bobbing action of said load body member relatively to said axle member while said vehicle travels with said load over rough roads.

6. In a vehicle: a wheel axle member; a load body member; resilient means supporting said body member on said axle member; an electrically operated weight indicator; a switch having a circuit switching action for changing the indicating condition of said weight indicator when a load of desired predetermined weight has been placed on said load body member; and means automatically preventing the operation of said circuit switching action of said switch until said load has been substantially emptied from said load body member.

7. In a vehicle: a wheel axle member; a load body member; resilient means supporting said body member on said axle member; an electrically operated weight indicator; a switch having a circuit switching action for changing the indicating condition of said weight indicator when a load of desired predetermined weight has been placed on said load body member; means preventing the change of indicating condition of said weight indicator by said switch by the bobbing action of said load body member relatively to said axle member while said vehicle is travelling with said load over rough roads; and means automatically restoring the original control of said switch over said indicator in response to load conditions when said load of desired predetermined weight has been substantially emptied from said load body member.

References Cited in the file of this patent

UNITED STATES PATENTS

| 2,779,013 | Chotro | Jan. 22, 1957 |

FOREIGN PATENTS

| 57,349 | Denmark | Mar. 4, 1940 |